July 25, 1967  J. BUSH ET AL  3,333,131

COMMUTATING POLE ASSEMBLY FOR A DYNAMOELECTRIC MACHINE

Filed Dec. 1, 1964

WITNESSES:
John L. Chopp
Edward F. Possessky

INVENTORS
Joseph Bush and
Albert W. Kimball, Sr.
BY
ATTORNEY

United States Patent Office 3,333,131
Patented July 25, 1967

3,333,131
COMMUTATING POLE ASSEMBLY FOR A DYNAMOELECTRIC MACHINE
Joseph Bush, Lancaster, and Albert W. Kimball, Sr., Buffalo, N.Y., assignors to Westinghouse Electric Corporation, Pittsburgh, Pa., a corporation of Pennsylvania
Filed Dec. 1, 1964, Ser. No. 415,030
9 Claims. (Cl. 310—194)

The present invention relates to dynamoelectric machines and more particularly to commutation pole assemblies therefor.

It is generally well known that the purpose of employing an interpole or commutating pole assembly in a dynamoelectric machine is to promote improved commutation through control of the magnetic flux level and hence through control of armature coil induced voltages in the commutating zone. The efficiency and economy with which a commutating pole achieves improved commutation is materially dependent on the structural organization of the commutating coil and the commutating pole piece.

For example, in machines requiring conductive strap coils and having a given pole body depth in the machine radial direction and a given number of coil strap turns, spacing of the strap turns along the maximum amount of available body depth, consistent with creepage avoidance and coil securance needs, leads to optimum commutation performance and manufacturing economy. The spacing of the coil turns increases the coil surface available for dissipation of the heat generated by the current flow in the coil. With the added heat dissipating ability, the cross section of the coil conductor can be decreased thus requiring less copper and securing greater manufacturing economy. Commutation performance with a solid coil (no space between turns except that required for insulation) and a spaced turn coil can be equivalent but the spaced turn coil is the more economic construction.

In accordance with the principles of the present invention, improved commutation is provided in a dynamoelectric machine by a commutating pole assembly having strap coil turns optimally spaced or "spread" along the pole body depth by a unique spacing arrangement. Manufacturing economy and improved coil strength against mechanical and current induced forces are realized. The coil is structurally related to the pole body in a manner which assures fixed retention of the optimum coil placement and interturn spacing during machine use.

It is, therefore, an object of the invention to provide a novel commutating pole assembly in a dynamoelectric machine which provides improved commutation.

Another object of the invention is to provide a novel commutating pole assembly in a dynamoelectric machine which includes a coil having improved mechanical strength.

A further object of the invention is to provide a novel commutating pole assembly in a dynamoelectric machine which includes a coil having substantially optimum spacing along the pole body depth.

It is an additional object of the invention to provide a novel commutating pole assembly in a dynamoelectric machine which includes a coil having substantially optimum spacing along the pole body depth while further having substantially rigid placement in relation to the pole body.

It is another object of the invention to provide a novel commutating pole assembly in a dynamoelectric machine which includes a coil with strap turns spaced in a manner which results in coil manufacturing economy.

It is a further object of the invention to provide a novel commutating pole assembly in a dynamoelectric machine which includes a coil with strap turns rigidly spaced from each other by means assembled with manufacturing facility notwithstanding variations in the thickness of successive strap turns.

These and other objects of the invention will become more apparent upon consideration of the following detailed description along with the attached drawings, in which.

Figure 1:
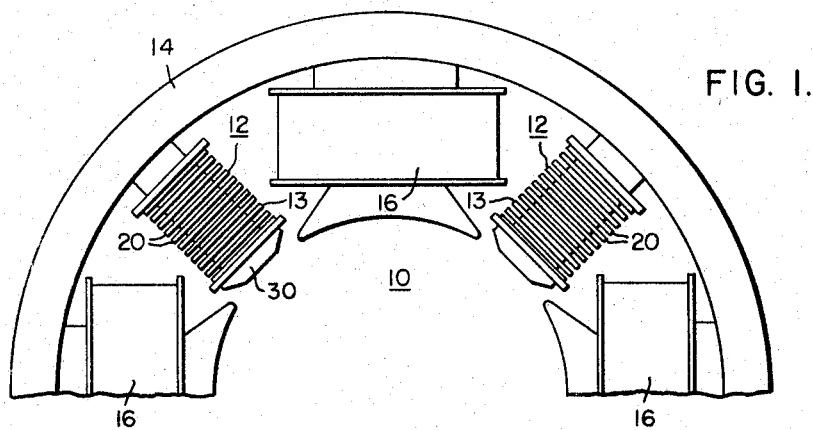
FIGURE 1 shows a portion of a dynamoelectric machine frame and the manner in which a commutating pole assembly is disposed therein in accordance with the principles of the invention.
Figure 2:
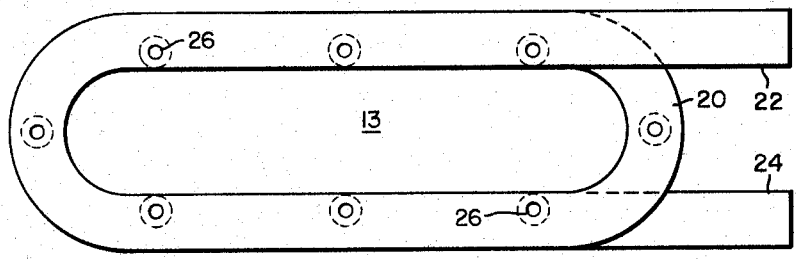
FIG. 2 is a top plan view of a commutating coil employed in the commutating pole shown in FIG. 1.

More specifically, there is shown in FIG. 1 a dynamoelectric machine 10 in which a commutating pole assembly 12 includes a coil 13 disposed on a pole piece 30 which in turn is secured to a machine frame 14 at an intermediate or interpole location between main poles 16. In this instance, four main poles (not all shown) are provided about the inner machine frame periphery and a like number of commutating poles 12 are also employed.

The purpose of using the commutating pole 12 in the machine 10 is to produce magnetic flux in the commutating zone for improved commutation through control of induced voltages in armature coils undergoing commutation. As previously noted, the structure of the commutating pole 12 and its parts is a direct determinant of the character of the resulting commutation as well as the economy with which it is achieved. In particular, the commutating coil 13 is preferably provided with maximum "spread" among its turns 20 and along the radial pole body depth.

Figure 3:
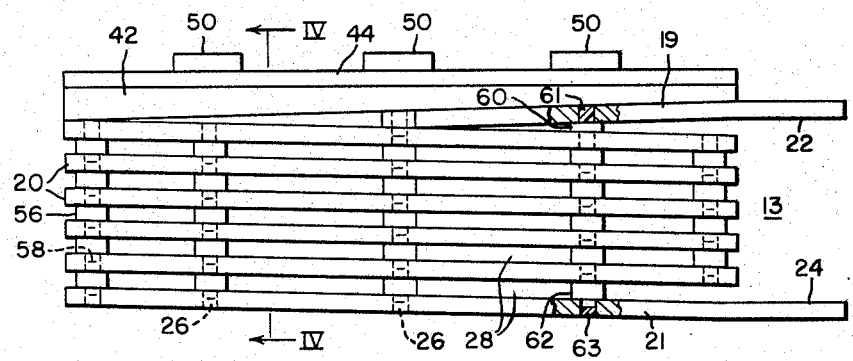
FIG. 3 shows a side view of the coil shown in FIG. 2 in assembled relation within the commutating pole assembly.
Figure 4:
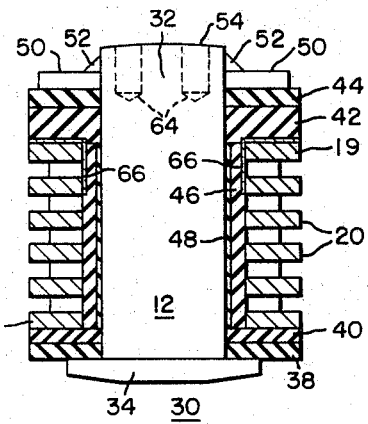
FIG. 4 shows a cross section taken along the reference line IV—IV of FIG. 3.

To form the coil 13, conductive strap material (such as copper) of predetermined cross section is edge wound on a suitable form until the desired number of turns 20 are wound. The turns 20 include end turns 19 and 21 which are provided with lead extensions 22 and 24 both preferably extending to one side of the coil 13. While the coil turns 20 are still tightly formed, aligned holes 26 are drilled through the turns 20 preferably with substantially equal strap length interposed therebetween. The coil turns 20 then are spread to obtain approximately equal spacing between successive turns 20 as indicated by the reference character 28 (FIG. 3), and an overall coil spread for optimum coil distribution on the pole piece 30.

The pole piece 30 includes a magnetic shank or body portion 32 of generally rectangular cross section. At its radial inmost or pole face surface there is provided a coil retaining tip or pole shoe 34 against which electrically insulative washer means or washers 38 and 40 are disposed to prevent creepage from the coil 13 to the pole shoe 36. A glass polyester material can be used for the washers 38 and 40.

The inner end coil turn 21 is disposed against the washer 40 and the coil turns 20 are spread radially outwardly to a point where additional creepage avoidance washers 42 and 44 are disposed against the outer coil end turn 19. To hold the coil 13 tightly against twisting movement relative to the pole piece 30, an electrically insulative spacer 46 is disposed between the pole body portion 32 and the coil 13. Additional electrical isolation of the coil 13 can be provided, if desired, by means of wrap around insulation 48 disposed between the pole body portion 32 and the spacer 46.

Block means 50 are secured or welded as indicated by the reference character 52 at or very nearly at the radially outer end face 54 of the pole body portion 32. The welding is completed while the block means 50 is held against the washers 42 and 44 and the coil 13, and when the welding is completed the washers 38, 40, 42 and 44 and the coil 13 are all held rigidly on the pole piece 30. The overall spread of the coil 13 prior to placement over the insulative spacer 46 on the pole body 32 thus is preferably just equal to or just slightly larger than the distance between the washers 40 and 42. In other terms, the coil spread is made as great as possible while leaving just sufficient space on the pole body 32 for weldment of the block means 50.

Rigid interturn spacing in the coil 13 itself is provided by an arrangement including electrically insulative disc like spacers or buttons 56 inserted between successive coil turns 20. Each button includes at least one projection 58 mating with an associated coil turn hole 26 to operate as means for captivating the buttons 56 in their respective interturn locations. Enough buttons 56 are distributed along each adjacent pair of coil turns 20 to provide rigid interturn support. If desired, the endmost buttons 60 and 62 can be bonded by a suitable epoxy or other cement to the end turns 19 and 21 as indicated by the reference characters 61 and 63 so as to rigidize the same in the coil assembly.

Since the thickness of successive coil turns 20 in the coil can vary as a result of varying bulge produced by edge winding the coil 13, such dimensional differences can be conveniently taken up by simply using spacer buttons 56 of varying thickness according to interturn spacing requirements as the coil 13 is assembled. When the coil assembly is completed with the spacer buttons 56 in their respective interturn locations and then secured to the pole piece 30 over the spacer 46 as previously described, interturn compressive forces are rigidly counteracted by the spacer buttons 56 while interturn tensile or spreading forces are rigidly counteracted by the washers 38, 40, 42 and 44 between the block means 50 and the pole shoe 36.

Prior to securance of the commutating pole assembly 12 to the machine frame 14, the coil 13 can be insulatively coated and baked while on the pole piece 30. Suitable bolt means (not shown) can then be extended through the machine frame to engage the pole piece 30 in threaded openings 64 extending inwardly from the radially outmost surface 54 of the pole piece 30. The entire commutating pole assembly 12 is thus rigidly placed in relation to the machine frame 14.

As shown, a retaining block 50 is disposed centrally on each side of the pole body 32 at each frame bolt threaded opening 64 since such openings 64 provide a convenient securance point for a fixture (not shown) used for holding the blocks 50 in place against the washers 42 and 44 during block welding. To protect the coil end turn 19 against weld heat, a suitably formed thermal barrier protective member 66 can be disposed between the washer 42 and the coil end turn 19. Preferably, the blocks 50 are formed from stainless steel or other non-magnetic material to minimize leakage flux from the coil 13.

In the completed commutating pole assembly 12, rigid and creepage free securance is achieved for the coil 13 while optimum or maximum coil turn spread is provided along the radial depth of the pole body 32. The coil 13 is held secure against expanding or contracting coiling movement as well as unitary movement. Coil strength against mechanical and current forces is thus highly favorable and improved commutation is achieved under widely varying application conditions. Further, assembly of the coil 13 and disposition of it on the pole body 32 are relatively simple and thus characterize the pole construction with manufacturing economy.

The foregoing description has been presented only to illustrate the principles of the invention. Accordingly, it is desired that the invention be not limited by the embodiment described, but, rather, that it be accorded an interpretation consistent with the scope and spirit of its broad principles.

What is claimed is:

1. In a dynamoelectric machine, a commutating pole assembly comprising a pole piece having a body portion and a strap coil having a predetermined number of turns spread along a substantial portion of the radial depth of said pole body and electrically insulated therefrom, means retaining said coil against unitary movement relative to said pole piece and retaining said coil turns against coil expansion, a plurality of spacers individually interposed between successive coil turns to prevent coiling compression of said coil turns, and a plurality of holes in each of said turns, each of said spacers having at least one projection mating with at least one associated turn hole so as to be held in its interturn position.

2. In a dynamoelectric machine, a commutating pole assembly as set forth in claim 1 wherein each hole in each turn extends through the turn thickness and is aligned with corresponding holes in the other turns.

3. In a dynamoelectric machine, a commutating pole assembly as set forth in claim 1 wherein spacers between successive turns are variable in thickness to take up interturn spacing differences caused by variable turn bulging produced during coil winding.

4. In a dynamoelectric machine, a commutating pole assembly comprising a pole piece having a body portion and a strap coil having a predetermined number of turns spread along a substantial portion of the radial depth of said pole body and electrically insulated therefrom, means retaining said coil against unitary movement relative to said pole piece and retaining said coil turns against coil expansion, a plurality of spacers individually interposed between successive coil turns to prevent coiling compression of said coil turns, a plurality of holes in each of said turns, each of said spacers being disc like in form and having a single projection on one of its sides mating with an associated turn hole so as to be held in its interturn position.

5. In a dynamoelectric machine, a commutating pole assembly as set forth in claim 4 wherein each hole in each turn extends through the turn thickness and is aligned with corresponding holes in the other turns.

6. In a dynamoelectric machine, a commutating pole assembly comprising a pole piece having a body portion and a strap coil having a predetermined number of turns spread along a substantial portion of the radial depth of said pole body and electrically insulated therefrom, means retaining said coil against unitary movement relative to said pole piece and retaining said coil turns against coil expansion, a plurality of spacers individually interposed between successive coil turns to prevent coiling compression of said coil turns, said retaining means including a plurality of non-magnetic block-like members secured to said pole body and retaining said coil against movement in the outward radial direction of the machine.

7. In a dynamoelectric machine, a commutating pole assembly as set forth in claim 6 wherein said block-like members are formed from stainless steel and are welded to said pole body in respective locations proximate to respective pole mounting bolt holes in the radially outmost surface of said pole body.

8. In a dynamoelectric machine, a commutating pole assembly comprising a pole piece having a body portion and a strap coil having a predetermined number of turns spread along a substantial portion of the radial depth of said pole body and electrically insulated therefrom, means retaining said coil against unitary movement relative to said pole piece and retaining said coil turns against coil expansion, a plurality of spacers individually interposed between successive coil turns to prevent coiling compression of said coil turns, said retaining means including a plurality of non-magnetic block-like members secured to said pole body and retaining said coil against movement in the outward radial direction of the machine, a plurality of holes in each of said turns, and each of said spacers having at least one projection mating with at least one associated turn hole so as to be held in its interturn position.

9. In a dynamoelectric machine, a commutating pole assembly as set forth in claim 8 wherein each spacer is disc like in form and is provided with a single projection on one of its sides.

References Cited

UNITED STATES PATENTS

| | | | |
|---|---|---|---|
| 975,425 | 11/1910 | Hensley | 310—194 |
| 1,179,030 | 4/1916 | Pearson | 310—194 |
| 2,251,152 | 7/1941 | Mortensen | 310—218 |
| 2,347,063 | 4/1944 | Pollard et al. | 310—194 |

MILTON O. HIRSHFIELD, *Primary Examiner.*

L. L. SMITH, *Assistant Examiner.*